J. H. ANDRUS & T. L. HAMMOND.
Vehicle Shade.
No. 198,444. Patented Dec. 25, 1877
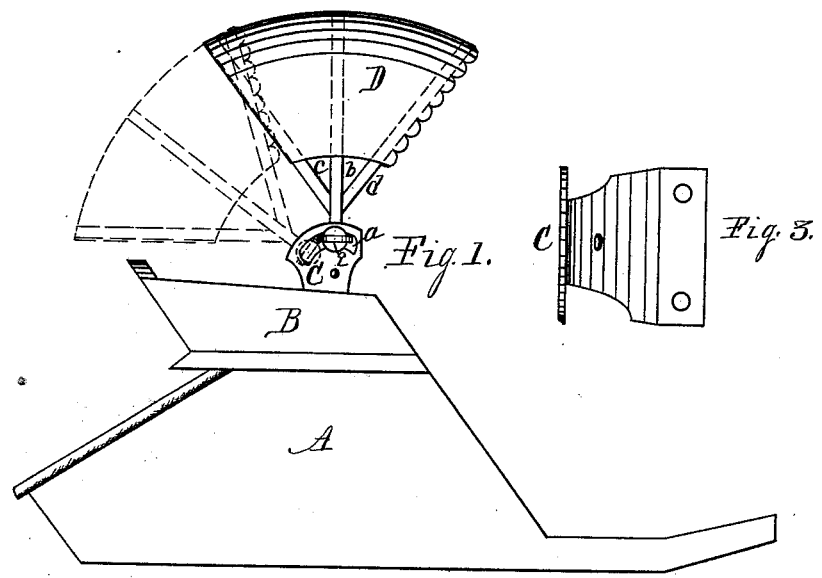
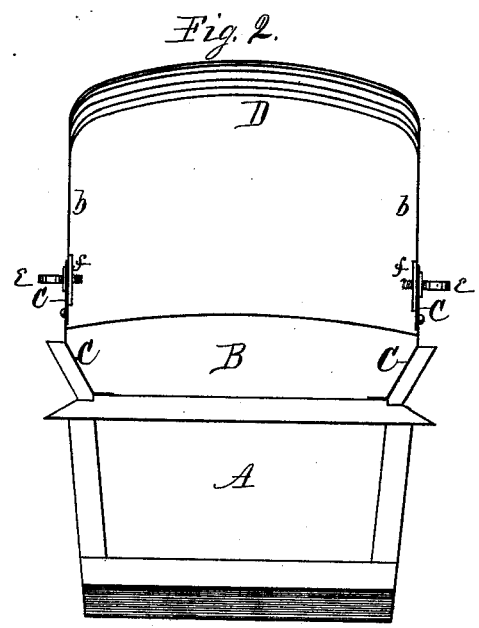

UNITED STATES PATENT OFFICE.

JOHN H. ANDRUS AND THOMAS L. HAMMOND, OF WAVERLY, IOWA.

IMPROVEMENT IN VEHICLE-SHADES.

Specification forming part of Letters Patent No. 198,444, dated December 25, 1877; application filed September 18, 1877.

*To all whom it may concern:*

Be it known that we, JOHN H. ANDRUS and THOMAS L. HAMMOND, of the city of Waverly, in the county of Bremer and State of Iowa, have invented a new and useful Improvement in Vehicle or Buggy Shades, which improvement is fully set forth in the following specification and accompanying drawings, in which—

Figure 1 is a side elevation of a buggy body and shade with our improvement attached. Fig. 2 is a front elevation of the same, and Fig. 3 a detached plan view of the slotted arm which connects the shade with the seat or body of the vehicle.

The object of our invention is to provide a device to connect the shade with the seat or body of vehicles, that will admit of a backward and forward swinging movement of the shade, to adjust it to intercept the rays of the sun, or to afford protection from storms, and to fix it in such adjusted position, all of which we accomplish by means of the devices which we now proceed to explain.

In the drawings, A represents a buggy-body, and B a buggy-seat secured thereon, all of which is substantially the same as some bodies and seats now in use.

Metallic supporting-arms (represented at C,) are secured to the seat-bottom, and rest against the inner sides of the seat, with their ends rising above the seat ends. The upward-projecting portions of these metallic arms are provided with curved slots, as shown at *a*.

D represents a shade, substantially the same as have been and now are in use, and in this instance is composed of ribs or bows *b*, *c*, and *d*, framed and secured to each other, and covered, in the usual manner, with oil-cloth or other suitable material. This shade is pivoted or hinged at its lower end, in a detachable manner, to the metallic arm C, a suitable distance below their upper ends, in such manner as to permit it to swing backward and forward.

*e* are thumb-screws, which pass through the curved slots *a*, and enter a screw-threaded plate or nut, *f*, secured to the shade-bows, by means of which the bows are clamped to the metallic arms, which holds the shade in any adjustable position (backward or forward) within the limits of the curved slots.

In manufacturing our improved shades we propose, in some or most instances, to make them detachable, which may be accomplished by constructing its pivotal connection in hook form, in such manner that when it is thrown to either extreme, backward or forward, it can be disconnected from the metallic arms and removed from the seat, and again replaced when wanted. We have represented this form of our shade in connection with a buggy-body, but also design it to be used on all vehicles requiring such shades, and on which it can be applied.

Our improved shade is well adapted for use on farm-wagons, business and peddlers' wagons, and is designed to be applied to either the seat or the body of the vehicle.

We claim as our invention—

The metallic supporting-arms C, having curved slots *a*, and adapted to be rigidly secured to a wagon-seat bottom, and rest in contact with the inner surfaces of the sides of the seat, in combination with the bows of a shade, which are pivoted to the supporting-arms on studs located below and equidistant from the ends of the curved slots, and set-screws extending through said curved slots, and secured to the bows of the shade, substantially as described.

JOHN H. ANDRUS.
THOMAS L. HAMMOND.

Witnesses:
ALFRED F. BROWN,
ANDREW J. TANNER.